Oct. 27, 1925.
A. R. McARTHUR
BARK REMOVING TOOL
Filed May 1, 1924      2 Sheets-Sheet 1
1,558,735
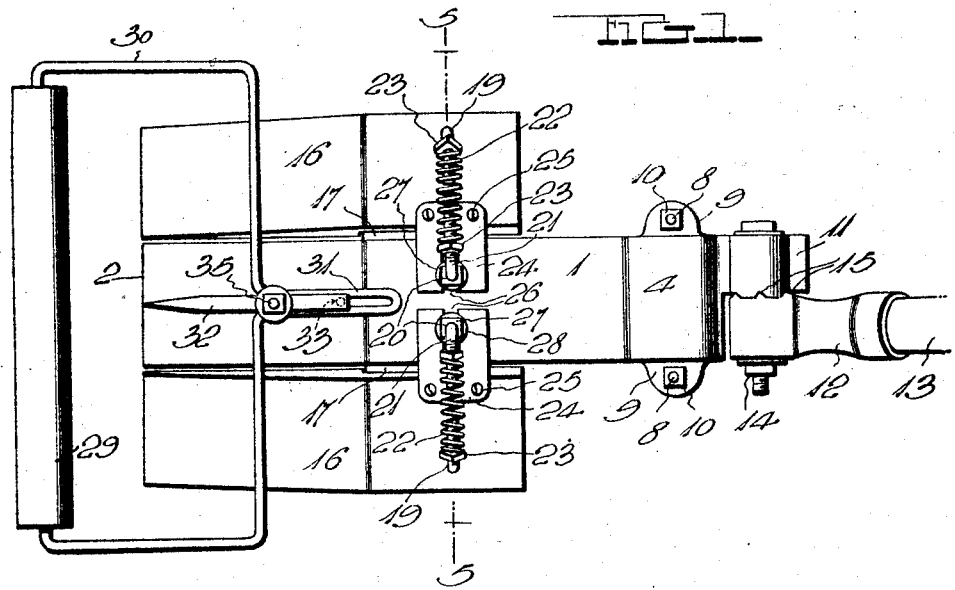
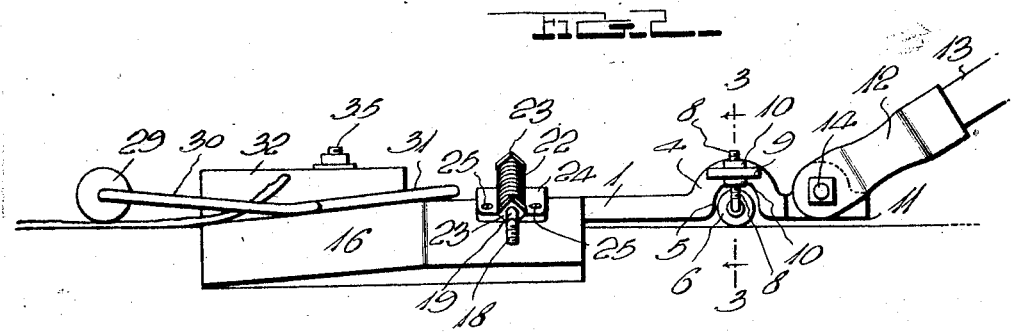
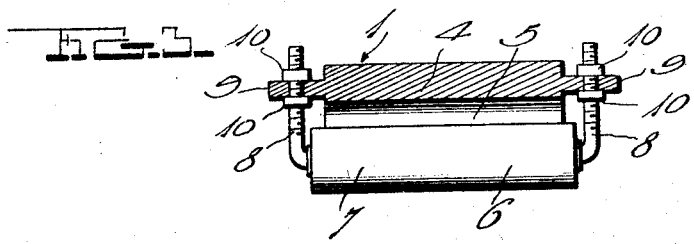
Inventor
A. R. McArthur
Witness
H. Woodard
By H. B. Willson &co
Attorneys

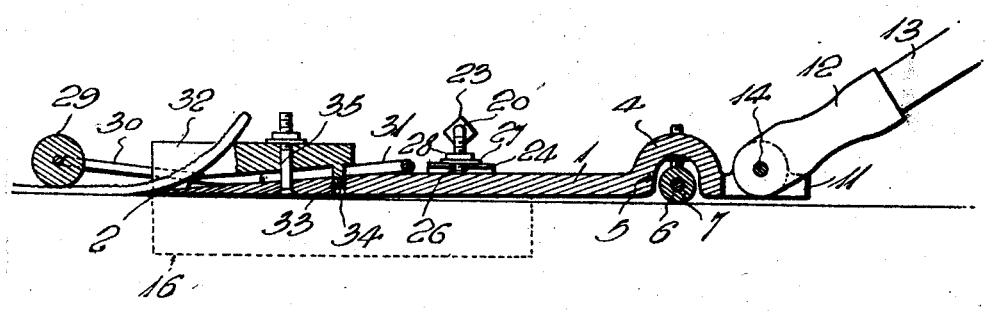
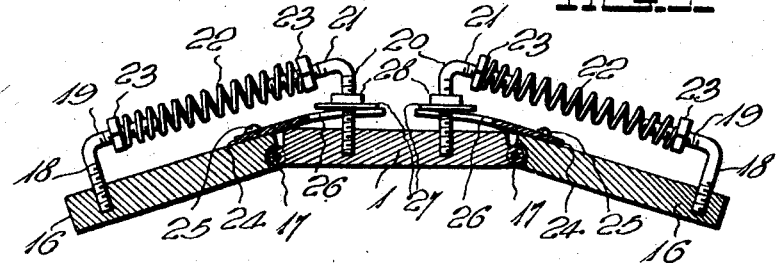
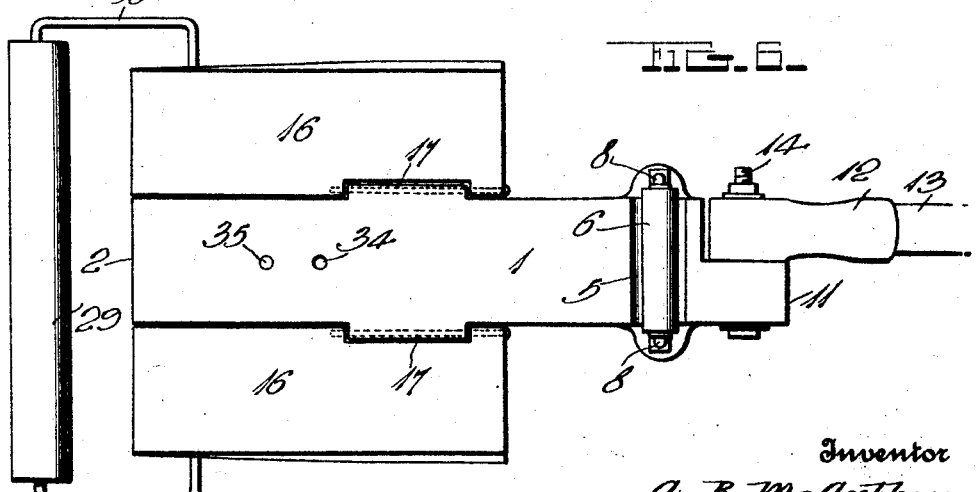

Patented Oct. 27, 1925.

1,558,735

UNITED STATES PATENT OFFICE.

ARTHUR R. McARTHUR, OF NEWPORT, WASHINGTON.

BARK-REMOVING TOOL.

Application filed May 1, 1924. Serial No. 710,405.

*To all whom it may concern:*

Be it known that I, ARTHUR R. MCARTHUR, a citizen of Canada, a resident having declared my intention to become a citizen of the United States, residing at Newport, in the county of Pend Oreille and State of Washington, have invented certain new and useful Improvements in Bark-Removing Tools; and I do declare the following to be a full, clear, and exact description of the invention, such as will enable others skilled in the art to which it appertains to make and use the same.

My invention aims to provide a simple and inexpensive, yet an efficient and easily operated tool for removing bark from logs and poles so that they can be used for numerous purposes, such as masts and spars.

In carrying out the above end, a further aim is to provide a tool of the type set forth which is transversely curved and is provided with means whereby its curvature may be varied to conform to that of the member from which the bark is being removed.

With the foregoing and minor objects in view, the invention resides in the novel subject matter hereinafter described and claimed, the description being supplemented by the accompanying drawings.

Figure 1 is a plan view.

Figure 2 is a side elevation.

Figure 3 is a transverse sectional view as indicated by line 3—3 of Fig. 2.

Figure 4 is a central vertical longitudinal sectional view.

Figure 5 is a vertical transverse section as indicated by line 5—5 of Fig. 1.

Figure 6 is a bottom plan view.

In the form of construction selected for illustration in the present application, the numeral 1 designates an elongated, central blade section which is beveled on its upper side to form a cutting edge 2 at its front end. The rear portion of the blade section 1 is preferably bowed upwardly as indicated at 4 to provide a transverse groove 5 in its lower side within which groove, a roller 6 is disposed, to travel upon the log or the like being peeled. In the present showing, the roller 6 is mounted on an axle 7 having upstanding arms 8 at its ends which pass through apertured ears 9 projecting oppositely from the portion 4 of the blade section 1, nuts 10 being threaded on said arms above and below said ears, so that the roller may be vertically adjusted to any desired extent. Behind the portion 4, the blade section 1 has been shown as provided with a rearwardly extending lug 11 to which a socket 12 for a handle 13, is adjustably connected, for instance, by a pivot bolt 14 and interengaging teeth 15 on the lug and socket. When the bolt is loosened, the socket and handle may be swung to any desired position and tightening of the bolt will secure them in such position.

At opposite edges of the central blade section 1, two shorter blade sections 16 are shown, the three sections being angularly related so as to impart a transverse curvature to the blade formed by said sections. These sections are hingedly connected at 17, in any desired manner, so that their angular relation may be varied and consequently, the curvature of the blade may be changed, according to the curvature of the log or the like from which bark is to be removed.

Spring means are preferably employed to normally swing the blade sections 16 downwardly, with respect to the central section 1, and I may well use the construction shown for this purpose. Upwardly projecting pins or rods 18 have been illustrated, threaded at their lower ends into the outer portions of the blade sections 16 and having laterally extended upper ends 19 which overlie said blade sections and are positioned transversely thereof. Other pins or rods 20 have been shown threaded into and rising from the central blade section 1, said rods having outwardly extended upper ends 21 which are alined with the lateral ends 19 of the pins 18. A pair of coiled compression springs 22 have their ends engaged with the pin ends 19 and 21 and these pin ends are provided with nuts or other abutments 23, against which said springs act. Obviously, by adjusting the positions of these nuts, the strength of the springs 22 may be varied, as occasion may demand.

Means are provided to limit the movement of the blade sections 16 under the influence of the springs 22. In the construction shown, stop plates 24 are secured by screws or the like 25 to the inner portions of the blade sections 16, said plates projecting inwardly over the section 1 and having notches or other openings 26 receiving the pins 20. These pins are provided with vertically adjustable abutments, each of which preferably consists of a washer 27 and a nut 28, and these abutments overlie the stop plates 24 as shown most clearly in Fig 5, so as to effectively limit the downward swinging of the sections 16. By adjusting the nuts 28, it will be seen that these blade sections will either be raised or lowered with respect to the section 1, to change the transverse curvature of the entire device.

I prefer to employ a transverse guide roller 29, in advance of the transversely curved blade. A rectangular carrying frame 30 has been shown for this roller, said frame being provided at its rear end with an elongated yoke 31 which rests on the beveled front end of the central blade section 1, provision being made whereby said yoke, frame and roller may be forwardly and rearwardly adjusted. In the present showing, a bark splitting wedge 32 rests centrally upon the front portion of the blade section 1 and also rests in part upon the yoke 31, said wedge preferably having a downwardly extending pin 33 passing through said yoke 31 and into an opening 34 in the blade section 1. A bolt 35 has been shown for securing the wedge 32 to the section 1 of the blade and this bolt passes also through the yoke 31 so that it co-operates with the pin 33 to hold said yoke against canting. When the bolt 35 is loosened, the yoke 31 and parts connected therewith may be forwardly or rearwardly adjusted and due to the bevel of the blade section 1, along which the yoke is moved, said parts will be adjusttd vertically also to some extent. Tightening of the bolt, tightly clamps the yoke 31 between the part 1 and the wedge 32 and thus secures the frame 30 and roller 29 in adjusted position. Whenever desired, the roller and frame may be quickly and easily detached.

By providing the construction shown and described, or a substantial equivalent thereof, a tool is provided which may be easily operated to effectively remove bark from logs or poles of different diameters, it being an easy matter to adjust the curvature of the tool, as occasion may dictate.

As excellent results may be obtained from the details disclosed, they may well be followed, but it is to be understood that this disclosure is for illustrative purposes only and that within the scope of the invention as claimed, numerous changes may be made.

I claim:

1. A bark removing tool comprising a blade adapted to be moved longitudinally of a log and curved transversely of its line of movement, said blade being formed of a plurality of longitudinally disposed angularly related sections, and connecting means between said sections adjustable to vary their angular relation, thereby allowing varying of the blade curvature according to the circumferential curvature of the log from which bark is to be removed.

2. A bark removing tool comprising a blade adapted to be moved longitudinally of a log and formed of a plurality of hingedly connected sections substantially parallel with the blade's line of movement, spring means acting on the blade sections and exerting its force to relatively angle the same and thus impart a curvature to the blade transversely of its line of movement, and means for limiting the relative movements of said blade sections under the action of said spring means.

3. A bark removing tool comprising a blade adapted to be moved longitudinally of a log and formed of a plurality of hingedly connected sections substantially parallel with the blade's line of movement, spring means acting on the blade sections and exerting its force to relatively angle the same and thus impart a curvature to the blade transversely of its line of movement, and adjustable means for limiting the relative movements of said blade sections under the action of said spring means.

4. A bark removing tool comprising a blade formed of a plurality of hingedly connected sections, pins extending upwardly from two adjacent blade sections and having laterally directed upper ends extending toward each other, and a coiled compression spring having its ends engaged with said lateral pin ends.

5. A bark removing tool comprising a blade formed of a plurality of hingedly connected sections, pins extending upwardly from two adjacent blade sections and having laterally directed upper ends extending toward each other, a coiled compression spring whose ends receive said lateral pin ends, and abutments on said pin ends engaging said spring, at least one of said abutments being adjustable along the pin end by which it is carried.

6. A bark removing tool comprising a blade formed of a plurality of hingedly connected sections, pins extending upwardly from two adjacent blade sections and having laterally directed upper ends extending toward each other, a coiled compression spring having its ends engaged with said lateral pin ends, a stop projecting from the inner edge of one of said blade sections to a point adjacent the pin of the adjacent section, and an abutment on the last named pin overlying said stop to limit the action of said spring.

7. A bark removing tool comprising a blade formed of a plurality of hingedly connected sections, pins extending upwardly from two adjacent blade sections having laterally directed upper ends extending toward each other, a coiled compression spring having its ends engaged with said lateral pin ends, a stop projecting from the inner edge of one of said blade sections to a point adjacent the pin of the adjacent section and a vertically adjustable abutment on the last named pin overlying said stop to limit the action of said spring.

8. A bark removing tool comprising a transversely curved blade sharpened at one end, a guide roller spaced outwardly from said sharpened end of said blade, a carrying frame for said roller having an elongated yoke resting on the central portion of the blade, a bark splitting wedge on said blade and resting on said yoke, and a bolt securing said wedge to said blade and passing through said yoke.

9. A bark remover comprising a transversely curved blade having a central rearward projection formed in its lower side with a transverse groove, a handle connected to the rear end of said projection, a guide roller in said groove, and vertically adjustable means connecting said roller with said projection.

In testimony whereof I have hereunto affixed my signature.

ARTHUR RUTHVEN McARTHUR.